United States Patent
Jones et al.

(10) Patent No.: US 9,045,194 B2
(45) Date of Patent: *Jun. 2, 2015

(54) RETROFITTING A CONVENTIONAL CONTAINMENT VESSEL INTO A COMPLETE INTEGRAL TANK DOUBLE-HULL CARGO CONTAINMENT VESSEL

(71) Applicant: Martin Operating Partnership L.P., Kilgore, TX (US)

(72) Inventors: Matthew Daniel Jones, Sugar Land, TX (US); Edward Henry Grimm, III, Houston, TX (US)

(73) Assignee: Martin Operating Partnership L.P., Kilgore, TX (US)

( * ) Notice: Subject to any disclaimer, the term of this patent is extended or adjusted under 35 U.S.C. 154(b) by 245 days.

This patent is subject to a terminal disclaimer.

(21) Appl. No.: 13/660,756

(22) Filed: Oct. 25, 2012

(65) Prior Publication Data

US 2014/0041178 A1 Feb. 13, 2014

Related U.S. Application Data

(63) Continuation-in-part of application No. 13/570,762, filed on Aug. 9, 2012.

(51) Int. Cl.
*B23P 6/00* (2006.01)
*B63B 9/04* (2006.01)
(Continued)

(52) U.S. Cl.
CPC .............. *B63B 9/04* (2013.01); *Y10T 29/49716* (2015.01); *B63B 25/16* (2013.01); *B23P 6/00* (2013.01); *B63B 11/02* (2013.01); *B63B 25/12* (2013.01); *B63J 2/14* (2013.01); *Y02T 70/80* (2013.01)

(58) Field of Classification Search
CPC ............ B23P 6/00; B60P 3/426; B63B 25/16
USPC ................. 29/401.1, 402.01, 402.04, 402.08; 114/73, 74 A, 74 R
See application file for complete search history.

(56) References Cited

U.S. PATENT DOCUMENTS 1,658,336 A 2/1928 Isherwood
2,359,549 A 10/1944 Epstein
(Continued)

FOREIGN PATENT DOCUMENTS

EP 267168 5/1988
EP 0459253 12/1991
(Continued)

OTHER PUBLICATIONS

John Kratochvil, Agriculture Trade & Transportation Manager, Agricultural Development and Marketing Division, Oregon Department of Agriculture, Utilizing Inland Waterway, Coastal and Open Ocean Barging of Containerized Agricultural.
(Continued)

*Primary Examiner* — Jermie Cozart
(74) *Attorney, Agent, or Firm* — Strasburger & Price, LLP

(57) ABSTRACT

A conventional containment vessel is retrofitted into a complete integral tank double-hull cargo containment vessel that includes a primary hull and a secondary hull disposed within the primary hull. The primary hull includes a topside deck structural member. The secondary hull includes an interior cargo containment tank. The secondary hull includes a topside structural member configured to seal the cargo containment tank. The primary hull is configured to serve as a first boundary between an operating environment of the vessel and the cargo. The secondary hull is configured to serve as a second boundary between the operating environment of the vessel and the cargo. The topside deck member of the primary hull and the topside structural member of the secondary hull are configured to provide a double-hull on the topside of the cargo containment tank.

21 Claims, 11 Drawing Sheets

(51) Int. Cl.
  *B63B 25/16* (2006.01)
  *B63B 11/02* (2006.01)
  *B63B 25/12* (2006.01)
  *B63J 2/14* (2006.01)

(56) References Cited

U.S. PATENT DOCUMENTS

| | | |
|---|---|---|
| 2,370,916 A | 3/1945 | Reedy, Sr. |
| 3,021,808 A | 2/1962 | Henry |
| 3,039,418 A | 6/1962 | Versulis |
| 3,083,668 A | 4/1963 | Marciano |
| 3,191,568 A | 6/1965 | Schroeder |
| 3,213,632 A | 10/1965 | Valt |
| 3,319,431 A | 5/1967 | Clarke |
| 3,326,167 A | 6/1967 | Paoli |
| 3,490,639 A | 1/1970 | Gibson |
| 3,605,425 A | 9/1971 | Cuneo |
| 3,721,362 A | 3/1973 | Bridges |
| 3,766,876 A | 10/1973 | Cowles |
| 3,875,886 A | 4/1975 | Glasfeld |
| 3,882,591 A | 5/1975 | Yamamoto |
| 3,931,424 A | 1/1976 | Heft |
| 3,941,272 A | 3/1976 | McLaughlin |
| 4,230,061 A | 10/1980 | Roberts |
| 4,359,958 A | 11/1982 | Durant |
| 4,660,491 A | 4/1987 | Murata |
| 4,672,906 A | 6/1987 | Asai |
| 4,744,321 A | 5/1988 | Pfeuffer |
| 5,007,225 A | 4/1991 | Teasdale |
| 5,176,029 A | 1/1993 | Dittrich |
| 5,375,547 A | 12/1994 | Abe |
| 5,398,630 A | 3/1995 | Skaarup |
| 5,469,799 A | 11/1995 | Iwai |
| 5,582,124 A | 12/1996 | Sikora |
| 6,035,796 A | 3/2000 | Vowels |
| 6,170,420 B1 | 1/2001 | Hagner |
| 6,357,373 B1 | 3/2002 | Hagner |
| 6,637,359 B1 | 10/2003 | Hagner |
| 6,708,636 B1 | 3/2004 | Hagner |
| 6,907,836 B2 | 6/2005 | Hagner |
| 6,984,452 B2 | 1/2006 | Kennedy |
| 7,047,899 B2 | 5/2006 | Laurilehto |
| 8,671,863 B2 | 3/2014 | Chen |
| 8,770,125 B2 | 7/2014 | Guerrier |
| 2004/0237865 A1 | 12/2004 | Hagner |
| 2005/0172880 A1 | 8/2005 | Laurilehto |
| 2006/0053806 A1 | 3/2006 | Tassel |
| 2009/0266087 A1 | 10/2009 | Adkins |
| 2010/0083671 A1 | 4/2010 | Liner |
| 2011/0192339 A1 | 8/2011 | Chen |
| 2012/0097088 A1 | 4/2012 | Guerrier |
| 2012/0137955 A1 | 6/2012 | VanTassel |
| 2012/0324910 A1 | 12/2012 | Shete |

FOREIGN PATENT DOCUMENTS

| | | |
|---|---|---|
| EP | 1894832 | 3/2008 |
| EP | 1914160 | 4/2008 |
| FR | 2719545 | 11/1995 |
| GB | 235397 | 6/1925 |
| GB | 2143182 | 2/1985 |
| JP | 57095288 | 6/1982 |
| JP | 4292292 | 10/1992 |
| JP | 2004330857 | 11/2004 |
| JP | 2011148358 | 8/2011 |

OTHER PUBLICATIONS

PCT International Search Report for International Application No. PCT/US13/54109 (our matter 133PCT) dated Jan. 17, 2014 (2 pages).
PCT International Search Report for International Application No. PCT/US14/35787 (our matter 4003PCT) dated Sep. 3, 2014 (2 pages).
PCT International Search Report for International Application No. PCT/US14/35919 (our matter 4004PCT) dated Sep. 3, 2014 (2 pages).
PCT Written Opinion of the International Searching Authority for International Application No. PCT/US13/35787 (our matter 133PCT) dated Jan. 17, 2014 (7 pages).
PCT Written Opinion of the International Searching Authority for International Application No. PCT/US14/35787 (our matter 4003PCT) dated Sep. 3, 2014 (5 pages).
PCT Written Opinion of the International Searching Authority for International Application No. PCT/US14/35919 (our matter 4004PCT) dated Sep. 3, 2014 (6 pages).
Joseph Keefe, 'The Versatile ATB Enters the LNG Game,' Maritime Report and MarineNews magazines online, MarineLink.com published Jul. 7, 2014 (4 pages).
US Patent and Trademark Office, Non-Final Office Action dated Jul. 14, 2014 for U.S. Appl. No. 13/570,762, filed Aug. 9, 2012 (our matter 0133) (11 pages).
Response to US Patent US Patent and Trademark Office Non-Final Office Action dated Jul. 14, 2014 filed on Jul. 31, 2014 for U.S. Appl. No. 13/570,762, filed Aug. 9, 2012 (our matter 0133) (26 pages).
US Patent and Trademark Office, Non-Final Office Action dated Oct. 9, 2014 for U.S. Appl. No. 13/570,762, filed Aug. 9, 2012 (our matter 0133) (21 pages).
Response to US Patent and Trademark Office Non-Final Office Action dated Aug. 9, 2014 filed on Oct. 9, 2014 for U.S. Appl. No. 13/570,762, filed Aug. 9, 2012 (our matter 0133) (19 pages).
US Patent and Trademark Office, Final Office Action dated Mar. 20, 2015 for U.S. Appl. No. 13/570,762, filed Aug. 9, 2012 (our matter 0133) (12 pages).

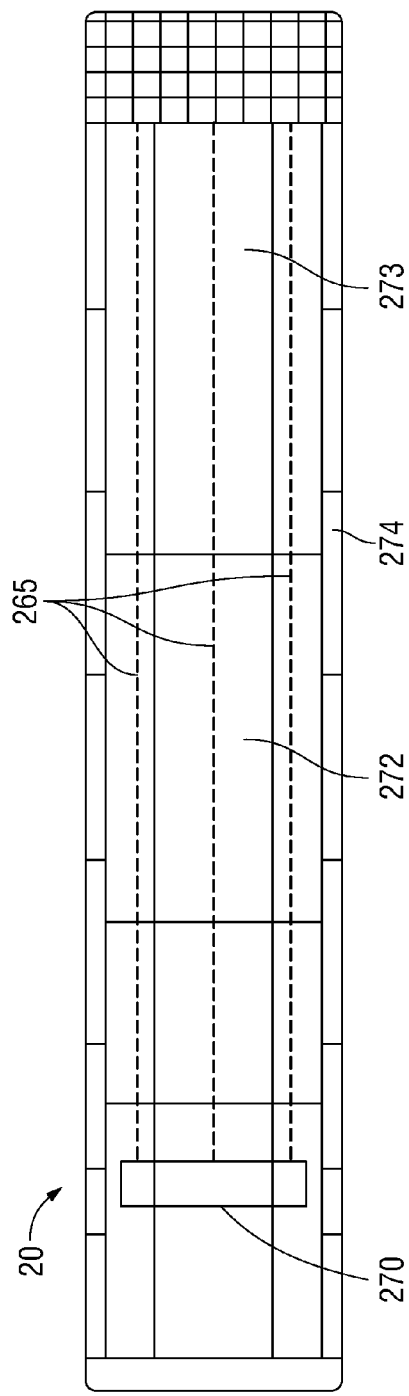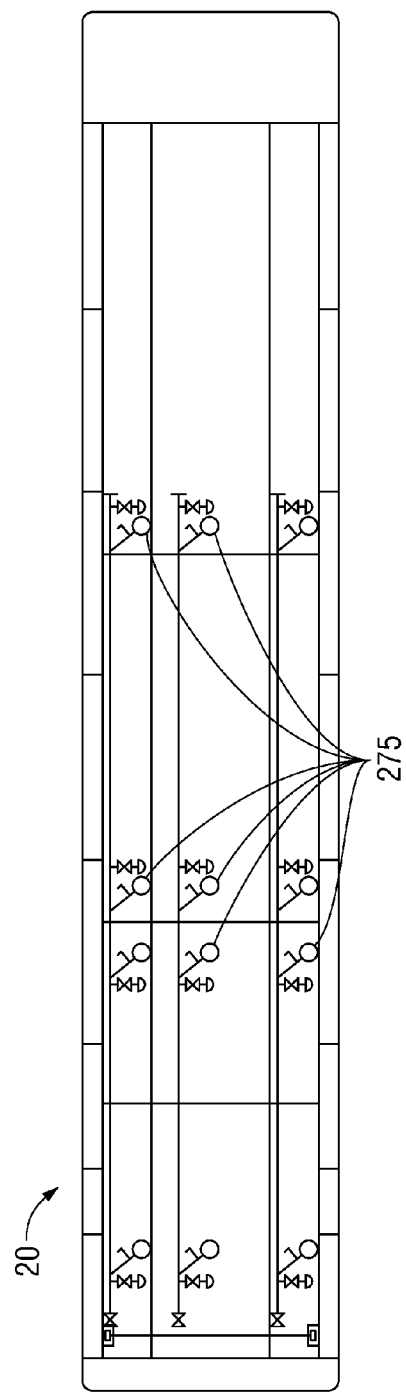

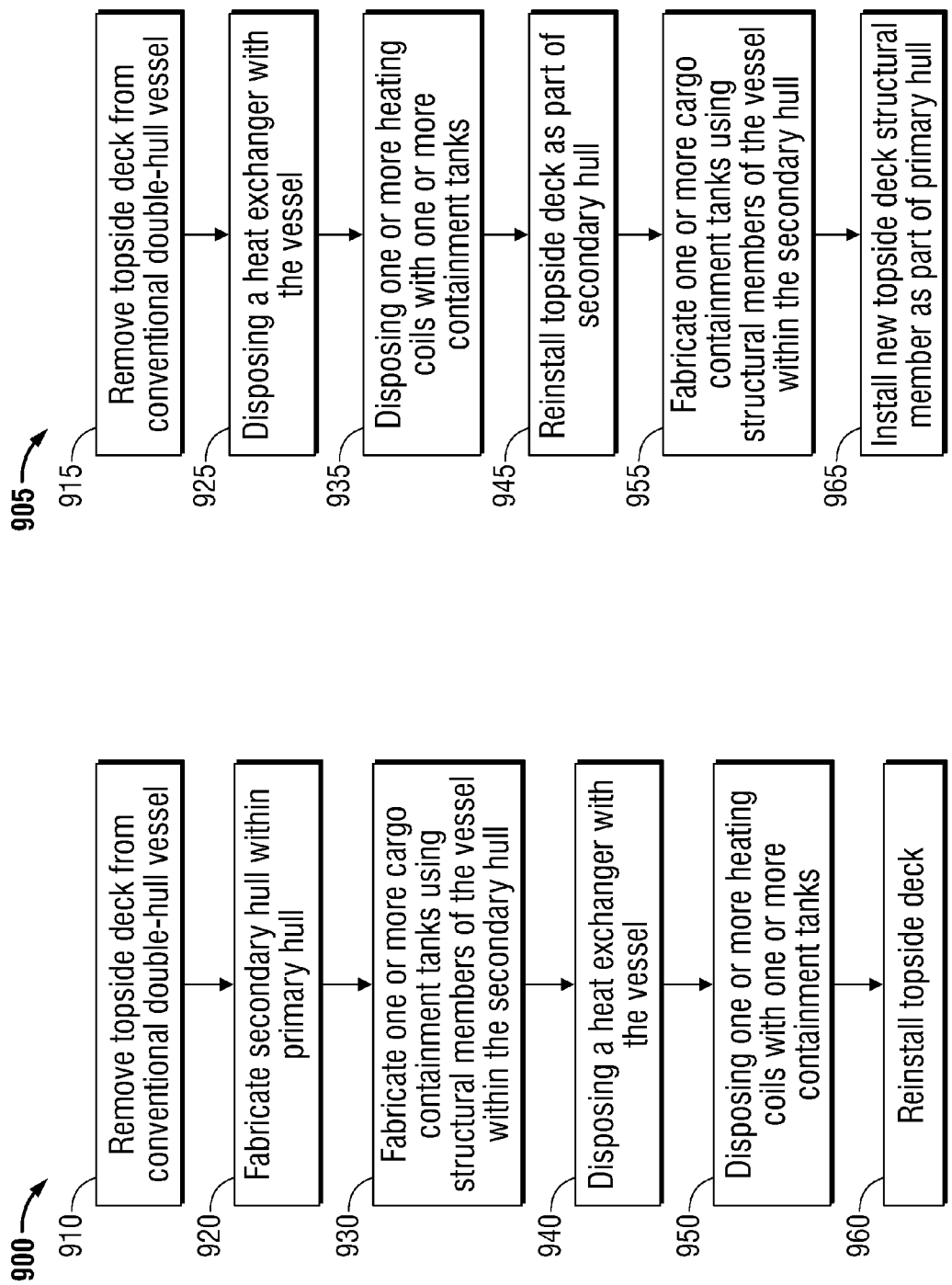

RETROFITTING A CONVENTIONAL CONTAINMENT VESSEL INTO A COMPLETE INTEGRAL TANK DOUBLE-HULL CARGO CONTAINMENT VESSEL

CROSS REFERENCE TO RELATED APPLICATION

This application is a continuation-in-part of co-pending U.S. application Ser. No. 13/570,762 filed Aug. 9, 2012, which is still pending and the application is hereby incorporated by reference for all purposes in its entirety.

BACKGROUND OF THE DISCLOSURE

1. Field of Disclosure

This disclosure primarily relates to retrofitting a conventional cargo containment vessel into a complete integral tank double-hull containment vessel for the transportation of hot cargo.

2. Description of the Art

Conventional cargo transport vessels include inland barges transport on inland waterways and ocean going on oceans and limited inland. Inland cargo transport vessels typically transport cargo relatively short distances over inland waterways. Ocean-going cargo transport vessels typically transport cargo relatively long distances over oceans.

A conventional single-hull cargo transport vessel includes a single hull that provides a boundary between the operating environment of the vessel and the cargo. The hull includes a bottom side structural member, a starboard side structural member, a port side structural member, and a topside deck that are connected to form the exterior of the vessel. The hull also includes transverse and longitudinal bulkheads to provide strength, support, and stability to the hull. A cargo carrying volume is formed by the bottom side structural member, starboard side structural member, port side structural member, and topside deck of the vessel. If the hull is breached, cargo may be exposed to the outside environment and/or the outside environment may be exposed to the cargo. In these instances, contamination of the outside environment, the cargo, or both may occur. To address environmental concerns related to the breach of conventional single-hull cargo transport vessels, governmental regulations now require the use of double-hulls for designated vessels in United States waters.

In accordance with these regulations, a conventional double-hull cargo transport vessel, as approved by current United States Coast Guard and International regulations and standards includes a primary hull and a partial secondary hull that forms a double-hull with respect to the bottom, port, and starboard sides of the vessel. A cargo carrying volume is formed by the bottom side structural member, starboard side structural member, and port side structural member of the partial secondary hull and the topside deck of the primary hull. As such, only the portion of the conventional double-hull cargo transport vessel that is in contact with the operating waterline depth environment of the vessel is double-hulled to prevent the leakage of cargo in the event the primary hull is breached.

BRIEF SUMMARY OF THE DISCLOSURE

In aspects, the present disclosure is related to a system and method of transporting cargo on waterways. Specifically, the present disclosure is related to the retrofit construction of a conventional vessel into a complete integral tank double-hull containment vessel for transporting hot cargo while maintaining containment of the hot cargo with respect to the outside environment.

According to one aspect of one or more embodiments of the present disclosure, a complete double-hull cargo containment vessel includes a primary hull and a secondary hull disposed within the primary hull. The secondary hull includes one or more interior cargo containment tanks and provides structural integrity to the vessel. The secondary hull includes a topside structural member configured to seal the cargo containment tank or tanks. The cargo tanks can include a split load of materials, such as asphalt and sulfur (sulphur) or a homogenous load of all asphalt or all sulfur.

According to one aspect of one or more embodiments of the present disclosure, a method of manufacturing a complete integral tank double-hull cargo containment vessel includes the steps of fabricating a primary hull and fabricating a secondary hull disposed within the primary hull. The secondary hull includes one or more interior cargo containment tanks. The secondary hull includes a partial side and complete topside structural member configured to seal the cargo containment tank or tanks.

According to one aspect of one or more embodiments of the present disclosure, a method of retrofitting a conventional vessel to a complete integral tank double-hull cargo containment vessel includes the steps of fabricating a primary hull and fabricating a complete secondary hull disposed within the primary hull. The secondary hull includes one or more interior cargo containment tanks. The secondary hull includes a partial side and complete topside structural member configured to seal the cargo containment tank or tanks. Other aspects of the present disclosure will be apparent from the following description and the appended claims.

BRIEF DESCRIPTION OF DRAWINGS

For a detailed understanding of the present disclosure, reference should be made to the following detailed description of the embodiments, taken in conjunction with the accompanying drawings, in which like elements have been given like numerals, wherein:

FIGS. 6A and 6B show a typical arrangement of the vessel where the vessel includes a heater (heat exchanger) installation with coils and cargo compartments in accordance with one or more embodiments of the present disclosure;

FIGS. 9A and 9B show methods of retrofitting a conventional double-hull cargo containment vessel into a complete integral tank double-hull cargo containment vessel in accordance with one or more embodiments of the present disclosure.

DETAILED DESCRIPTION OF THE DISCLOSURE

Figure 1A:
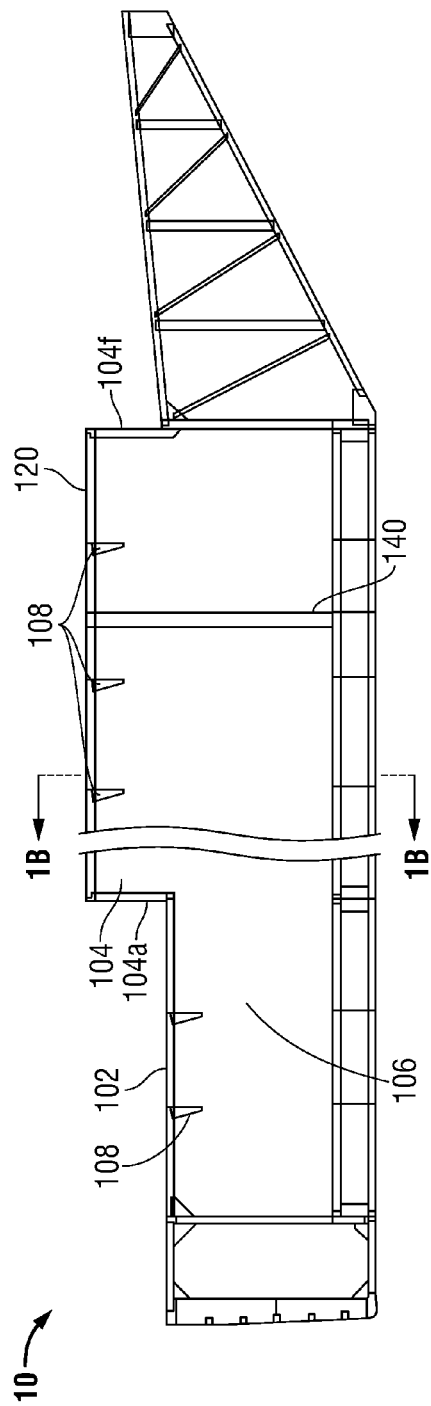
FIG. 1A shows a profile view of a conventional double-hull cargo transport vessel.

Generally, the present disclosure involves a system and method of transporting cargo on waterways. Specifically, the present disclosure is related to transporting hot cargo while maintaining containment of the hot cargo with respect to the outside environment. The present disclosure is susceptible to embodiments of different forms. The present disclosure is also related to retrofitting conventional double-hull vessels into complete double-hull vessels configured to transport hot cargo. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

FIG. 1A a profile view of a conventional double-hull cargo transport vessel. The conventional double-hull cargo transport vessel 10 includes a machinery deck 102 that is part of the top of cargo tank 106. The machinery deck 102 includes transverse frame supports 108 along the underside of the machinery deck 102. The vessel 10 also includes a raised deck portion 104 which can also be used for cargo storage. The raised deck portion 104 includes a top deck structural member 120 and the transverse frame supports 108 disposed along the underside of the top deck member 120, a forward side member 104f, a aft side member 104a, a port side member 104p (shown in FIG. 1B) and an starboard side member 104s (shown in FIG. 1B).

Figure 1B:
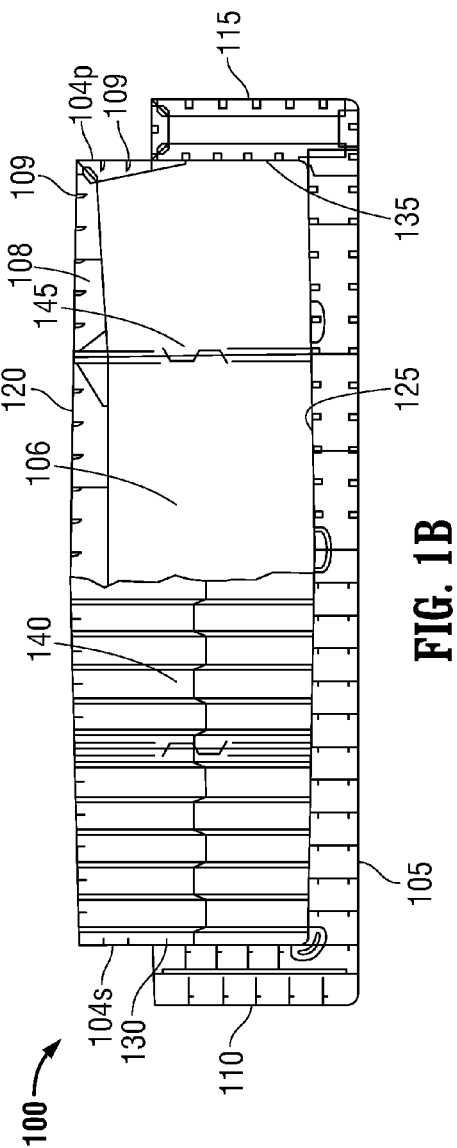
FIG. 1B shows a mid-ship section of a conventional double-hull cargo transport vessel as viewed from forward looking aft.

FIG. 1B shows a mid-ship section of a conventional double-hull cargo transport vessel viewing the vessel from forward to stern. Mid-ship section 100 shows a cross-sectional view of the middle of the conventional double-hull cargo transport vessel 10 (shown in FIG. 1A). One of ordinary skill in the art will recognize that, in accordance with industry standards, the cross-sectional view of the middle of the vessel shows transverse bulkheads on one side of the figure and transverse truss structures on the other side of the FIG. 1B.

A primary hull of the conventional double-hull cargo transport vessel 10 comprises a bottom side structural member 105, a starboard side structural member 110, a port side structural member 115, and a topside deck 120 that are generally formed of steel and joined together to form the primary hull. A transverse frame (or beam) support 108 of the topside deck 120 is shown. Longitudinal frame supports 109 are also shown. A partial secondary hull of the conventional double-hull cargo transport vessel 10 comprises a bottom side structural member 125, a starboard side structural member 130, and a port side structural member 135 that are generally formed of steel and joined together to form the partial secondary hull. This hull configuration of two bottom structural members 105, 125, two starboard side structural members 110, 130, two port side structural members 115, 135, and one topside deck 120 is commonly referred to as "a double-hull configuration" in industry.

The interior cargo carrying volume 106 of the conventional double-hull cargo transport vessel 10 is bounded by a bottom structural member 125, a starboard side structural member 130, and a port side structural member 135 of the partial secondary hull and depending upon the location of the interior cargo carry volume 106, the machinery deck 102 and the topside deck 120 of the primary hull. The cargo carrying volume 106 of the vessel 10 may be partitioned into one or more cargo containment tanks transversely by one or more transverse bulkheads 140 or longitudinally by one or more longitudinal bulkheads 145. In certain areas of the vessel 10, the cargo containment tanks may not include the volume provided in the raised deck portion 104.

The conventional double-hull design promotes the use of internal cargo tank framing. External topside framing is exposed to the elements and subject to corrosion/pitting, even if protective coatings are applied to the external topside framing.

The transport of some cargo requires maintaining the cargo at high temperatures during transport. This type of cargo may be referred to as "hot cargo". Examples of hot cargo may include, but are not limited to, one or more of: i) liquid asphalt, ii) molten sulfur, and iii) molten phenol. Liquid asphalt is typically transported at approximately 325 degrees Fahrenheit. Molten sulfur is typically transported at approximately 300 degrees Fahrenheit. Molten phenol is typically transported at approximately 140 degrees Fahrenheit.

A conventional double-hull cargo transport vessel utilizes one or more diesel-fired heat exchangers to heat one or more layers of heating coils disposed in a cargo tank to maintain the required temperature of the hot cargo during transport. The size and number of heat exchangers and heating coils is dependent on the size and configuration of the vessel 10 and the temperature requirements of the cargo to be transported. In addition to the initial cost for installing the heat exchangers and the heating coils, there is a recurring cost for their maintenance.

In operation, the heat exchangers consume fuel (such as diesel fuel) during transport. Thus, a cost for fuel is added to the cost of transport when the heat exchangers are required to operate during transport. The per transport cost of fuel required by the heat exchangers to maintain hot cargo at the appropriate temperature may be a substantial portion of the transport cost and may be proportional to the duration of the transport. In a conventional double-hull design, the cost of fuel may be increased due to heat loss through the topside deck structural member 120, which may be extensive. Substantial heat loss through the topside deck structural member 120 may require the heat exchangers to use more fuel to maintain the hot cargo at its required temperature.

The resultant heating of the topside deck structural member 120 may also present a hazard, or at least an uncomfortable situation, for personnel that may be present on top of the topside deck structural member 120. If the vessel operator wishes to make the topside deck structural member 120 safe for walking, insulation may be applied to effectively reduce the temperature of the topside deck member 120, however, this addition may add more cost to the vessel 10 for the insulation, as well as the installation and maintenance of the insulation.

Figure 2A:
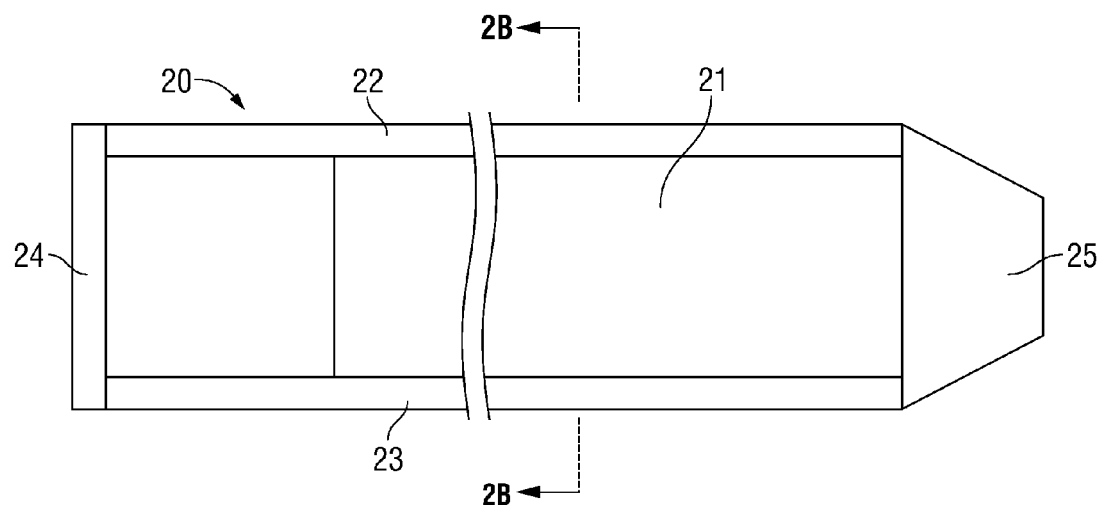
FIG. 2A shows a top view of a complete integral tank double-hull cargo containment vessel in accordance with one or more embodiments of the present disclosure.

FIG. 2A shows a top view of a complete integral tank double-hull cargo containment vessel 20 in accordance with one or more embodiments of the present disclosure. A raised trunk (and/or canopy) portion 21 of the complete integral tank double-hull cargo containment vessel 20 is shown, along with wing void tank areas 22 and 23 and aft and forward rake voids 24 and 25, respectively. Although not shown, one skilled in the art can appreciate that the raised portion 21 can extend from forward to aft to create a substantially box-shaped vessel.

Figure 2B:
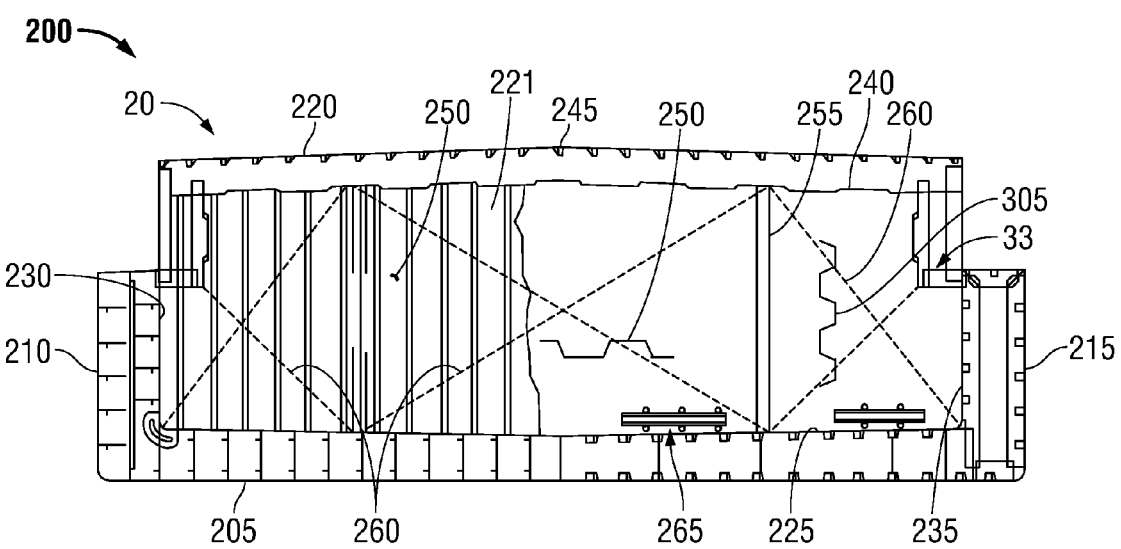
FIG. 2B shows a mid-ship section view of a complete integral tank double-hull cargo containment vessel as viewed from forward looking aft in accordance with one or more embodiments of the present disclosure.

FIG. 2B shows a mid-ship section of a complete integral tank double-hull cargo containment vessel 20 in accordance with one or more embodiments of the present disclosure. Mid-ship section 200 shows a cross-sectional view of the middle of a complete double-hull cargo containment vessel 20 in accordance with one or more embodiments of the present disclosure. One of ordinary skill in the art will recognize that, in accordance with industry standards, the cross-sectional view of the middle of the complete integral tank double-hull cargo containment vessel 20 shows transverse bulkheads 250 on the left side of the figure, and transverse truss structures on the right side of the figure.

In one or more embodiments of the present disclosure, a primary hull of a complete integral tank double-hull cargo containment vessel 20 comprises a bottom side structural member 205, a starboard side structural member 210, a port side structural member 215, and a topside deck structural member 220 that are generally formed of steel and joined together to form the primary hull. Each of the bottom side structural member 205, the starboard side structural member 210, the port side structural member 215, and the topside deck structural member 220 may individually comprise a plurality of sheet metal panels that are joined to form the respective structural members used to form the primary hull. Because unsupported sheet metal can deform when a force is exerted on it, reinforcements are used to provide strength and stability to the primary hull. The topside deck structural member 220 comprises a plurality of longitudinal panel stiffening beams 245 that are joined to the topside of the topside deck structural member 220. Each longitudinal panel stiffening beam 245 is generally comprised of sheet metal. The longitudinal panel stiffening beams 245 may be disposed on top of topside deck structural member 220, on the underside of topside structural member 220, or both. One of ordinary skill in the art will recognize that the number, orientation, and configuration of panel stiffening beams may vary in accordance with one or more embodiments of the present disclosure. The primary hull is water tight and serves as a first boundary between the operating environment of the complete integral tank double-hull cargo containment vessel 20 and the cargo.

In accordance with one or more embodiments of the present disclosure, a secondary hull of a complete integral tank double-hull cargo containment vessel 20 may comprise a bottom side structural member 225, a starboard side structural member 230, a port side structural member 235, a topside structural member 240 and a structural member 33 for the raised trunk portion 21 (at main deck level) that are generally formed of steel and joined together to form a complete secondary hull that is integrally disposed within the primary hull. Each of the bottom side structural member 225, the starboard side structural member 230, the port side structural member 235, the topside structural member 240 and the structural member 33 may generally comprise a plurality of sheet metal panels that are joined to form the respective structural members used to form the secondary hull. The various members are integral to the structural integrity of the complete integral tank double-hull cargo containment vessel 20. Advantageously, cargo may be contained within the secondary hull separate and apart from the primary hull, and the secondary hull is itself disposed within the primary hull. As a consequence, the secondary hull is configured such that hot cargo (such as oil, chemicals, etc.) and their respective fumes are sealed off from the operating environment of the complete integral tank double-hull cargo containment vessel 20 and the cargo.

In some embodiments, the complete integral tank double-hull cargo containment vessel 20 comprises an interior cargo carrying volume 221 that is bounded by the bottom side structural member 225, starboard side structural member 230, port side structural member 235, and the topside structural member 240 of the secondary hull. Advantageously, the entire interior cargo carrying volume is integrally disposed within the secondary hull that is itself integrally disposed within the primary hull.

The cargo carrying volume 221 may be partitioned into one or more cargo containment tanks 260. The cargo carrying volume may be partitioned transversely by one or more transverse bulkheads 250 and/or longitudinally by one or more longitudinal bulkheads 255. One or more of the transverse bulkheads 250 may be formed of corrugated sheet metal panels 305. One or more of the longitudinal bulkheads 255 may be formed of corrugated sheet metal panels 305. The one or more cargo containment tanks of the secondary hull are sealed by the topside structural member 240 of the secondary hull. Various or homogenous materials may be contained in the various compartment tanks depending on a customer's requirement.

In one or more embodiments of the present disclosure, one or more heating coils 265 are disposed within cargo containment tank 260. Advantageously, in one or more embodiments of the present disclosure, the entire interior cargo carrying volume of the complete integral tank double-hull cargo containment vessel 20 is disposed within the secondary hull that is itself disposed within the primary hull. As such, the secondary hull is insulated by the primary hull. Thus, in a complete integral tank double-hull cargo containment vessel 20, heat loss through the topside deck structural member 220 is substantially less than that of a conventional double-hull cargo transport vessel 10. As a consequence, the complete double-hull reduces vessel fabrication costs and energy costs associated with maintaining hot cargo at its required temperature during transport.

Figure 3:
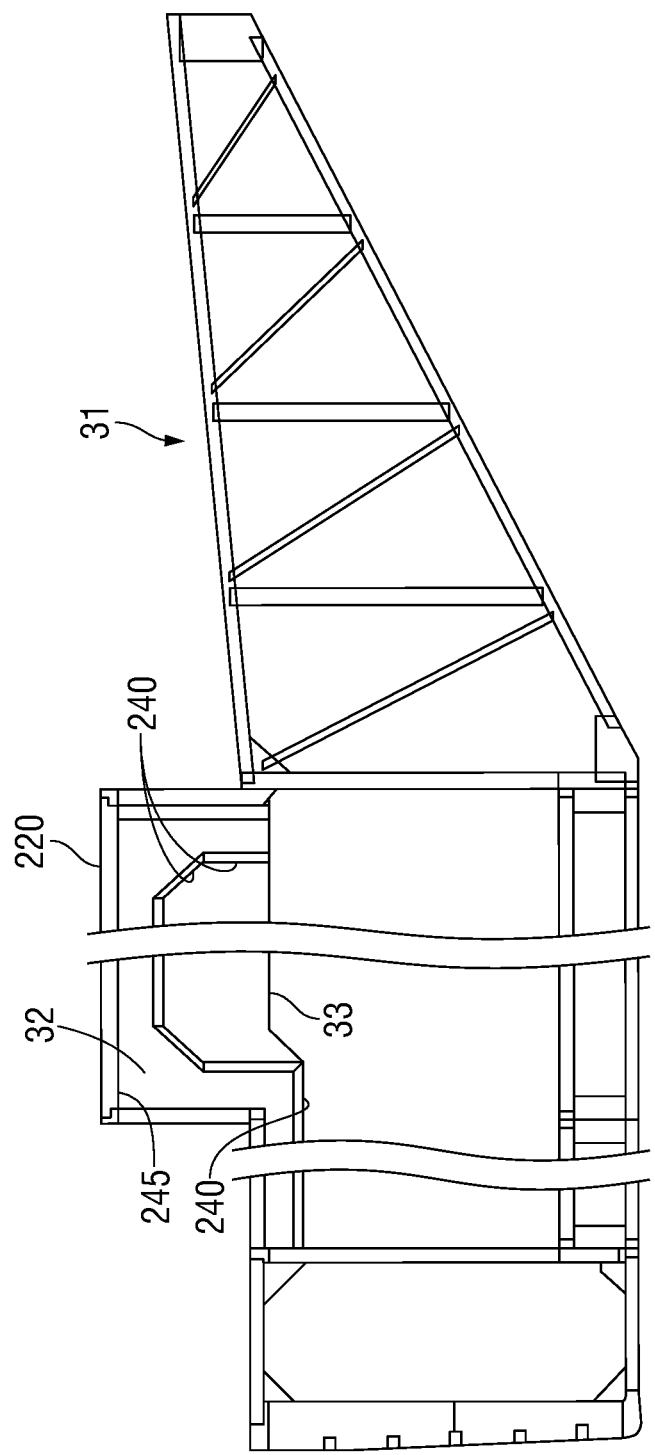
FIG. 3 shows a profile of the complete integral tank double-hull cargo containment vessel in accordance with one or more embodiments of the present disclosure.

FIG. 3 includes a partial profile view of the complete integral tank double-hull cargo containment vessel 20. The complete integral tank double-hull cargo containment vessel 20 may include a forward rake 31 and a raised trunk 32. The top deck structural member 220 with a longitudinal panel stiffening beam 245 of the raised trunk 32 is also shown.

Figure 4A:
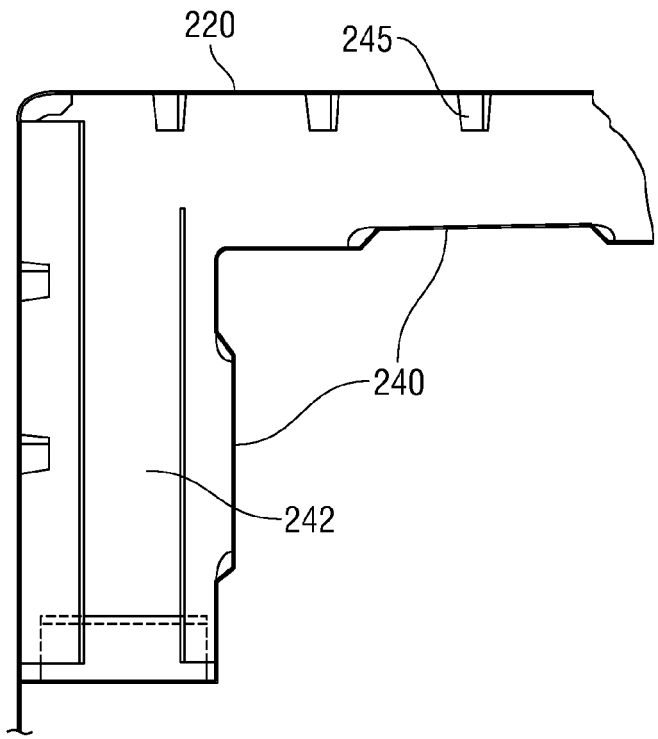
FIGS. 4A, 4B, and 4C show mid-ship section views of the tank top of the complete integral tank double-hull cargo containment vessel in accordance with one or more embodiments of the present disclosure.
Figure 4B:
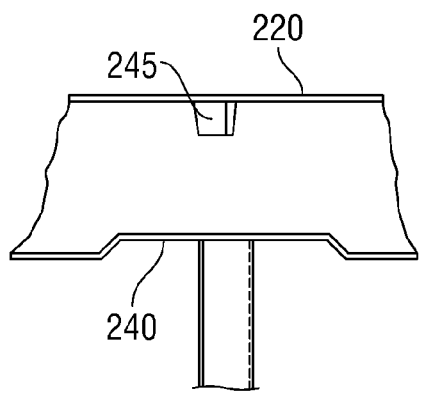
Figure 4C:
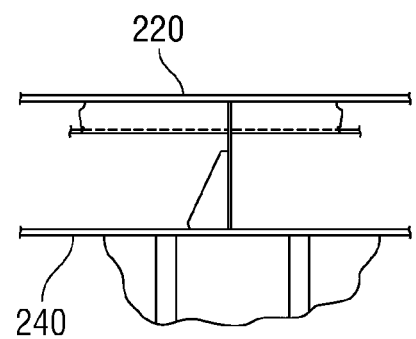

FIGS. 4A, 4B and 4C shows details of the novel double-hull containment of FIG. 2B in the areas which were not afforded double-hull protection in the conventional prior art design. Double-hull containment includes the topside structural member 220 and intersection of trunk sides to main (wing) deck. A void space 242 between the topside deck member 220 and the topside member of secondary hull 240 is shown.

Figure 5A:
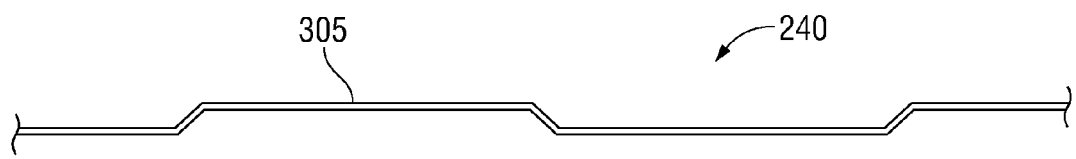
FIGS. 5A and 5B show structural members of the novel double-hull containment of the cargo tank top; either with a corrugated bulkhead (raised trunk) or flat plate structural member with suitable stiffeners in accordance with one or more embodiments of the present disclosure.

FIG. 5A shows a longitudinal corrugated topside structural member 240 of the secondary hull in accordance with one or more embodiments of the present disclosure. A longitudinal corrugated sheet metal panel 305 is sheet metal of a predetermined length and width that is, for example, 5/16 of an inch thick. One of ordinary skill in the art will recognize that the dimensions of a corrugated sheet metal panel may vary in accordance with one or more embodiments of the present disclosure. The longitudinal corrugated sheet metal panel 305 panel is corrugated in the longitudinal direction with respect to the lengthwise axis of the vessel. Topside structural member 240 of the secondary hull comprises a plurality of longitudinal corrugated sheet metal panels 305. One of ordinary skill in the art will recognize that the number, orientation, and configuration of corrugated sheet metal panels may vary in accordance with one or more embodiments of the present disclosure. The use of corrugated sheet metal panels or plates 305 reduces the number of required panel stiffening beams 246 and saves the associated cost in fabrication and materials. In one or more embodiments of the present disclosure, panel stiffening beams are not required for reinforcement of the topside structural member 240 of the secondary hull.

Advantageously, the use of corrugated sheet metal panels 305 to form the topside structural member 240 of the secondary reduces costs associated with the application, removal, and re-application of special coatings to one or more cargo containment tanks. If the topside structural member 240 is comprised of panel stiffening beams 245, the interior of one or more cargo containment tanks are not smooth and applied coating substances can build up at the interface of the panel stiffening beams 246 and the topside structural member 240. If the topside structural member 240 is comprised of corrugated sheet metal panels 305, the interior of one or more cargo containment tanks are smooth and applied coating substances can more easily be applied, removed, and re-applied. Maintenance costs for the topside structural member 240 may be reduced through the use of special coatings (reflective, anti-corrosion, etc.).

Figure 5B:
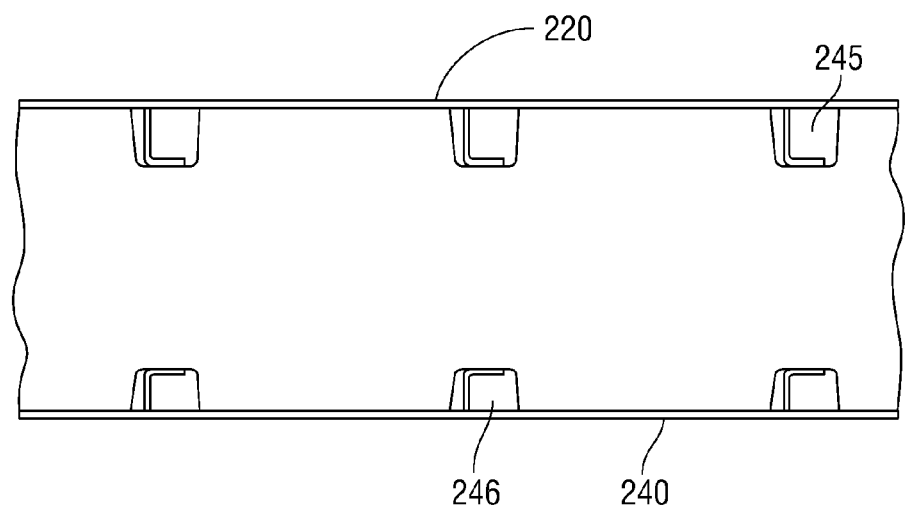

The complete double-hull provides strength and structural support to the complete integral tank double-hull cargo containment vessel 20 that is greater than that of a conventional double-hull cargo transport vessel 10. Unlike a conventional double-hull cargo transport vessel 10, where the topside deck structural member 120 may be used to provide structural integrity for the primary hull and the secondary hull, the complete double-hull design provides for structural support of the primary and secondary hulls from the topside deck structural member 220 and the topside structural member 240. The complete double-hull design provides for the flexibility of having the topside members 220, 240 each dedicated to a specific hull or having the topside members 220, 240 provide shared support in various combinations, as would be understood by one of skill in the art. In one or more embodiments of the present disclosure, the topside structural member 240 is generally comprised of sheet metal. Because unsupported sheet metal can deform when a force is exerted on it, reinforcements can be used to provide strength and stability to the secondary hull. In one or more embodiments of the present disclosure, panel stiffening supports or beams are used for reinforcement. FIGS. 5A and 5B shows a panel stiffened topside structural member 240 of a secondary hull in accordance with one or more embodiments of the present disclosure. The topside structural member 240 of the secondary hull may comprise a plurality of longitudinal panel stiffening beams (or supports) 246 that are joined to the topside structural member 240. Each longitudinal panel stiffening beam 246 is generally comprised of sheet metal. The longitudinal panel stiffening beams 246 may be disposed on top of topside structural member 240, on the underside of topside structural member 240, or both. One of ordinary skill in the art will recognize that the number, orientation, and configuration of panel stiffening beams may vary in accordance with one or more embodiments of the present disclosure. In some embodiments, because the secondary hull is disposed within the primary hull and the raised trunk formed by the topside structural member 240 of the secondary hull is covered by the topside deck structural member 220 of the primary hull, the longitudinal panel stiffening beams 246 may be used for reinforcement of the topside structural member 240 with a reduced risk of degradation due to standing water and/or corrosion.

FIGS. 6A and 6B show an exemplary top view arrangement of one or more embodiments of the present disclosure. In one or more embodiments of the present disclosure, and shown in FIG. 6A, a smaller heat exchanger 270 may be used in a complete integral tank double-hull cargo containment vessel 20 than in a conventional double-hull cargo transport vessel 10 with similarly sized cargo tank or tanks to maintain hot cargo at its required temperature during transport. A substantial cost savings is realized in acquiring and fabricating the smaller heat exchanger 270 and fuel costs associated with the heat exchanger 270. In addition, the heat exchanger 270 may have a reduced physical footprint allowing for more reclamation of valuable vessel space. In FIG. 6A, the heat exchanger 270 (typically housed on the machinery deck) is connected to coils 265 to provide thermal fluid (such as hot oil) heating through designated cargo tanks 272, 273 in accordance with one or more embodiments of the present disclosure. One skilled in the art can appreciate that the complete integral tank double-hull cargo containment vessel 20 can include additional forward, aft or wing (port or starboard) tanks (shown in FIG. 6A, but do not include reference numbers). Heating coils 265 may be routed to the additional tanks should it be necessary to transport heated materials in these tanks.

FIG. 6B illustrates the access domes and valves 275 on the top deck of the complete integral tank double-hull cargo containment vessel 20. The domes and valves 275 allow topside access to the containment tanks (it is noted that the figure does not show valves and ports for all containment tanks, but that one skilled in the art can appreciate that there would be an access dome to all containment tanks).

Since the double-hull structure allows insulation between topside deck structural member 220 and topside structural member 240, thermal losses through the top of the double-hull may be reduced. This thermal loss reduction may result in a reduced amount fuel being required to power the one or more heat exchangers 270 that drives one or more heating coils 265. This results in substantial per transport fuel cost savings over a conventional double-hull cargo transport vessel 10. In addition, the size and/or number of heating coils 265 disposed within each cargo containment tank 260 may be reduced because fewer heating coils 265 are required in a complete integral tank double-hull cargo containment vessel 20 than in a conventional double-hull cargo transport vessel 10 with similarly size cargo tank or tanks to maintain hot cargo at its required temperature during transport. As a result, vessel fabrication costs associated with the heating coils 265 are reduced and the energy costs associated with maintaining hot cargo at its required temperature during transport is substantially reduced. Additionally, reducing the volume occupied by heating coils 265 may increase volume available for storing hot cargo or other ship functions.

Further, because of the thermal insulation provided by the complete double-hull design (due to a void space between the topside members 220, 240), the temperature of topside deck 120, on which vessel crew may walk, may be sufficiently reduced to allow for personnel to walk on the topside deck 120 above a hot cargo without risk of temperature related injury. As a result, use of an insulating material is not required to make the topside deck member 120 walkable. This reduces the costs typically associated with installing insulating materials for the topside deck 120 in a conventional double-hull cargo transport vessel 10 and/or the cost of human protection devices. However, if desired, insulating materials may be added to the void space created by the complete integral double-hull design.

In some embodiments, the complete integral tank double-hull cargo containment vessel 20 may be used to transport volatile cargo subject to releasing fumes when exposed to temperature increases. Here, the complete double-hull design may reduce the heat transfer from outside the complete integral tank double-hull cargo containment vessel 20, such as due to radiant sunlight on the top deck 220, into the volatile cargo due to the insulating properties of the void space between top deck 220 and topside structural member 240. Thus, the complete double-hull design may reduce vapor pressure within the volatile cargo containment by reducing the amount of heat being added to the volatile cargo when the complete integral tank double-hull cargo containment vessel 20 is exposed a warm environment.

The reduced heat transfer in a complete integral tank double-hull cargo containment vessel 20 may have the added benefit of increasing the variety of volatile cargoes that may be transported without requiring recertification of the vessel as a pressure vessel. In embodiments where the complete integral thank double-hull cargo containment vessel 20 is configured for carrying volatile cargo, heating equipment (heating coils 265 and heat exchanger 270) may be optional.

In one or more embodiments of the present disclosure, a draft line of a complete integral tank double-hull cargo containment vessel 20 is established, in part, by the exterior of the vessel defined by the primary hull, the cargo carrying volume of the secondary hull, and the apparent specific gravity of the cargo in one or more cargo containment tanks. The apparent specific gravity of cargo is a ratio of the weight of the volume of cargo to the weight of an equal volume of a reference substance, for example, water. The apparent specific gravity of liquid asphalt is approximately 1.1 grams per cubic centimeter at transport temperature and the apparent specific gravity of molten sulfur is approximately 1.8 grams per cubic centimeter at transport temperature. Because these hot cargos have different specific gravities, the volume of hot cargo that may be transported in a given vessel, while meeting the draft requirements, differs based on the type of hot cargo. For example, a given volume of a substance with a higher specific gravity weighs more than an equal volume of a substance with a lower specific gravity. As such, the amount of cargo that can be transported in a given cargo carrying volume, within the draft requirements of the complete integral tank double-hull cargo containment vessel 20, differs based on the cargo transported. Moreover, a specific cargo may require a special coating to be applied to a cargo containment tank 260 whereas a different cargo may require a different special coating to be applied to a cargo containment tank 260.

In one or more embodiments of the present disclosure, two longitudinal bulkheads 255 partition the cargo carrying volume of the secondary hull into three cargo containment tanks 260. The starboard side and port side cargo containment tanks 260 are dedicated to the transport of liquid asphalt. The starboard side and port side cargo containment tanks 260 may be coated with a special coating required by the liquid asphalt. One of ordinary skill in the art will recognize that a different cargo may be used in the place of liquid asphalt in accordance with one or more embodiments of the present disclosure. The middle cargo containment tank 260 may be dedicated to the transport of molten sulfur. The middle cargo containment tank 260 may be coated with a special coating required by molten sulfur. One of ordinary skill in the art will recognize that a different cargo may be used in the place of molten sulfur in accordance with one more embodiments of the present disclosure. Thus, a complete integral tank double-hull cargo containment vessel 20 may have starboard and port side cargo containment tanks 260 coated for one cargo and a middle cargo containment tank 260 that is coated for a different cargo.

Advantageously, this configuration allows a complete integral tank double-hull cargo containment vessel 20 to transport liquid asphalt and molten sulfur without modification to or turnaround service on the complete integral tank double-hull cargo containment vessel 20. For example, the starboard and port side cargo containment tanks 260 may be prepared for liquid asphalt cargo and the middle cargo containment tank 260 may be prepared for molten sulfur. As such, a complete integral tank double-hull cargo containment vessel 20 may transport liquid asphalt up river to one destination and then transport molten sulfur down river to another destination without requiring a turnaround service on the complete integral tank double-hull cargo containment vessel 20. However, in another embodiment, rather than a split load, the complete integral tank double-hull cargo containment vessel 20 can transport homogenous materials, such as all asphalt or all sulfur in the cargo tanks 260. Thus, a complete integral double-hull cargo containment vessel 20 may be more efficient, provide higher cost efficiency, and generate higher transport revenues than a conventional double-hull cargo transport vessel 10.

Figure 7:
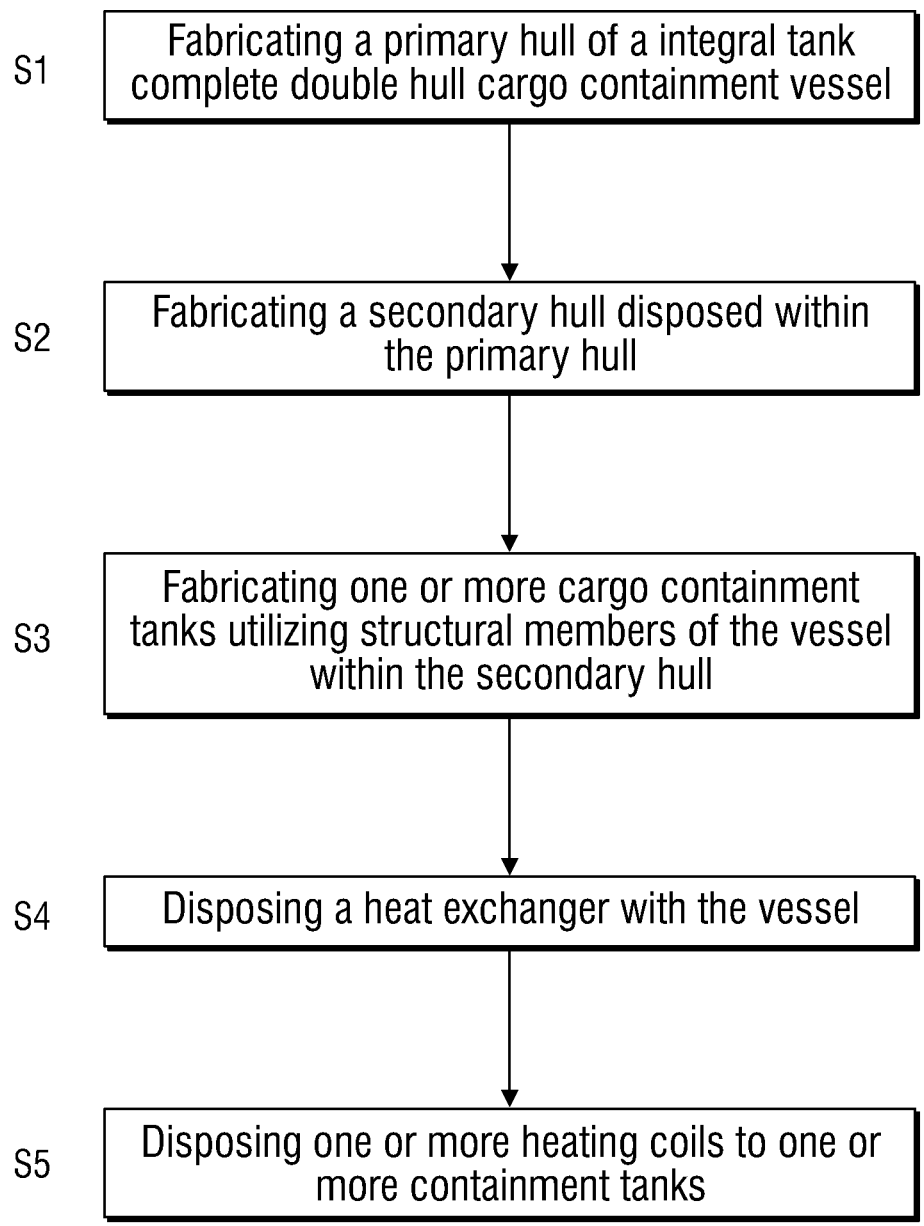
FIG. 7 shows a method of manufacturing a complete integral tank double-hull cargo containment vessel in accordance with one or more embodiments of the present disclosure.

FIG. 7 shows a method of retrofitting a conventional vessel to a complete integral tank double-hull cargo containment vessel 20 in accordance with one or more embodiments of the present disclosure. In step S1, a primary hull of a conventional vessel is retrofitted for use as a complete integral tank double-hull cargo containment vessel 20. The primary hull comprises a bottom side structural member 205, starboard side structural member 210, port side structural member 215, and a topside deck structural member 220. In step S2, a secondary hull of a complete integral tank double-hull cargo containment vessel 20 is fabricated. The secondary hull comprises a bottom side structural member 225, starboard side structural member 230, port side structural member 235, and a topside structural member 240. In one or more embodiments of the present disclosure, the topside structural member 240 comprises a plurality of corrugated sheet metal panels 246.

In step S3, one or more cargo containment tanks 260 are fabricated within the secondary hull of the complete integral tank double-hull cargo containment vessel 20. One or more transverse bulkheads 250 may be used to partition the secondary hull to form one or more cargo containment tanks 260. One or more longitudinal bulkheads 255 may be used to partition the secondary hull to form one or more cargo containment tanks 260. In one or more embodiments of the present disclosure, two longitudinal bulkheads 255 are fabricated to partition the secondary hull cargo carrying volume into three cargo containment tanks 260. In one or more embodiments of the present disclosure, the three cargo containment tanks 260 are configured to facilitate the transport of different cargos without turnaround service. The cargo containment tanks 260 are sealed by the secondary hull, which is disposed within the primary hull of the complete integral tank double-hull cargo containment vessel 20. In step S4, one or more heat exchangers 270 may be disposed on or within the complete integral tank double-hull cargo containment vessel 20 and secured in place. In step S5, one or more heating coils 265 may be disposed within each of the one or more cargo containment tanks 260. One of ordinary skill in the art will recognize that at least some of steps S1-S5 may be performed in different order to realize construction and cost efficiencies or customer preferences.

Figure 8B:
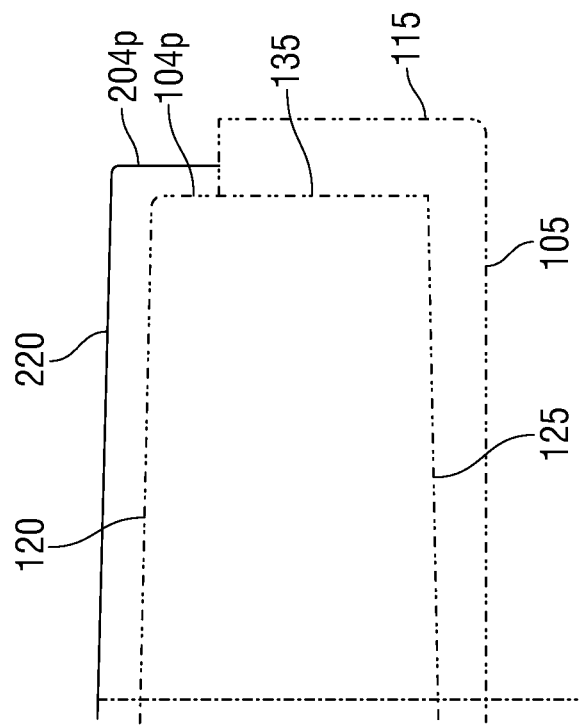
FIGS. 8A, 8B, 8C, 8D, 8E, and 8F shows a structure of sections of retrofitted double-hull cargo containment vessels in accordance with one or more embodiments of the present disclosure.
Figure 8A:
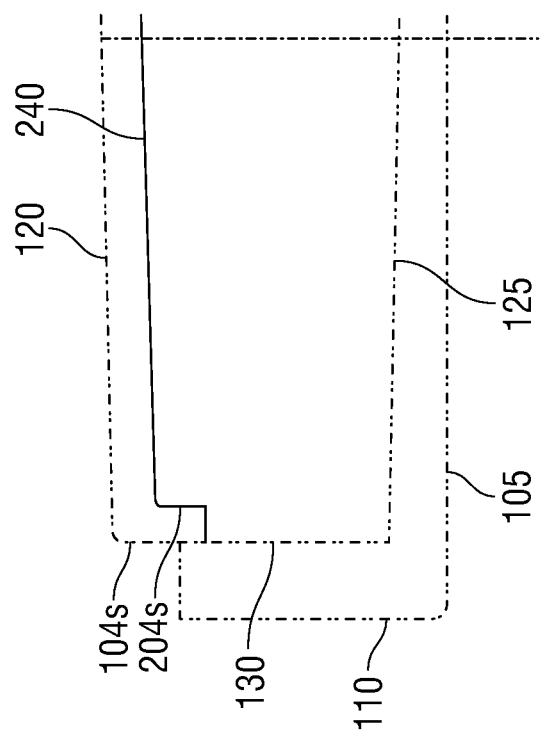

FIGS. 8A-8F show sections of complete integral tank double-hull cargo containment vessels 20 that have been retrofitted from conventional double-hull cargo transport vessels 10. While FIGS. 8A-8F show port and starboard sections, one of ordinary skill in the art would understand that the sections may be implemented on both starboard and port sides of a vessel. FIG. 8A shows a starboard side section of a conventional double-hull cargo transport vessel 10 with the topside deck 120 and the starboard side member 104s. The topside structural member 240 may be disposed below topside deck 120 and attached to starboard side member 204s. The clearances between i) the topside deck 120 and the topside structural member 240 and ii) the starboard side member 104s and the starboard side member 204s may be selected to conform to regulatory and/or design requirements or preferences.

FIG. 8B shows a port side section of a conventional double-hull cargo transport vessel 10 with the topside deck 120 and the port side member 104p. The topside deck structural member 220 may be disposed above topside deck 120 and attached to port side member 204p. The clearances between i) the topside deck 120 and the topside deck structural member 220 and ii) the port side member 104p and the port side member 204p may be selected to conform to regulatory and/or design requirements or preferences.

Figure 8D:
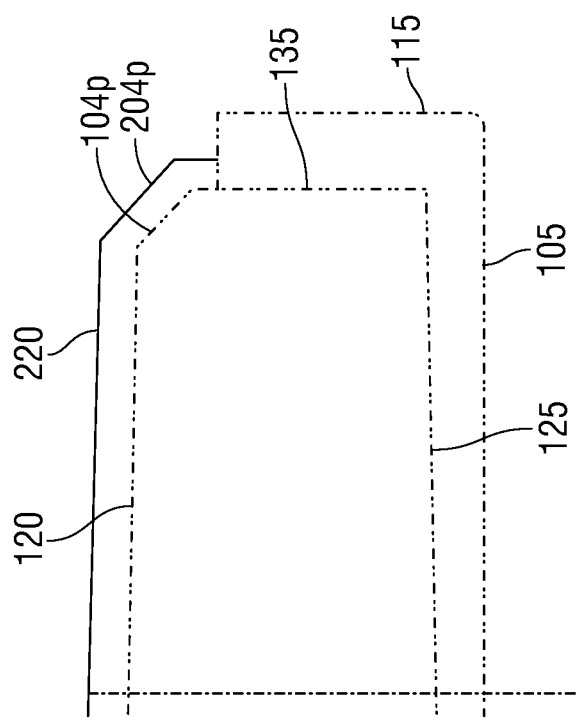
Figure 8C:
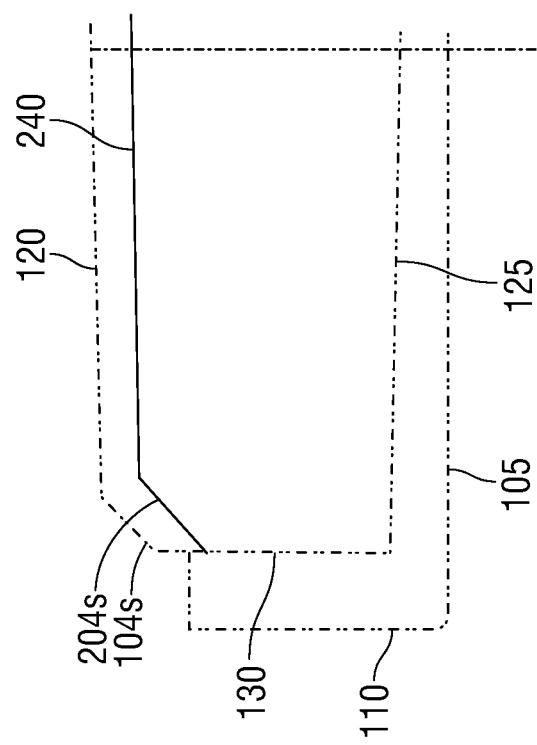

FIG. 8C shows a starboard side section of a conventional double-hull cargo transport vessel 10 with the topside deck 120 and the starboard side member 104s. Here, the corner of topside deck 120 is angled. The topside structural member 240 may be disposed below topside deck 120 and attached to starboard side member 204s. The topside structural member 240 may be angled to conform to the design of topside deck 120, however, such conformity with the general shape of topside deck 120 is not a requirement. The clearances between i) the topside deck 120 and the topside structural member 240 and ii) the starboard side member 104s and the starboard side member 204s may be selected to conform to regulatory and/or design requirements or preferences.

FIG. 8D shows a port side section of a conventional double-hull cargo transport vessel 10 with the topside deck 120 and the port side member 104p. Here, the corner of topside deck 120 is angled. The topside deck structural member 220 may be disposed above topside deck 120 and attached to port side member 204p. The topside structural member 240 may be angled to conform to the design of topside deck 120, however, such conformity with the general shape of topside deck 120 is not a requirement. The clearances between i) the topside deck 120 and the topside deck structural member 220 and ii) the port side member 104p and the port side member 204p may be selected to conform to regulatory and/or design requirements or preferences.

Figure 8F:
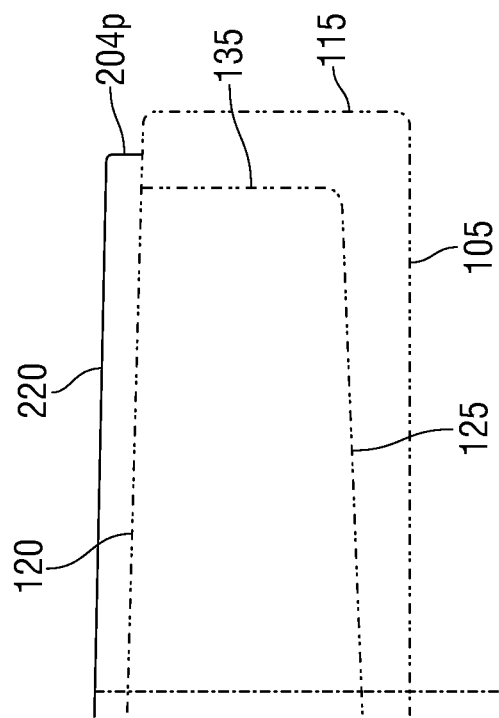
Figure 8E:
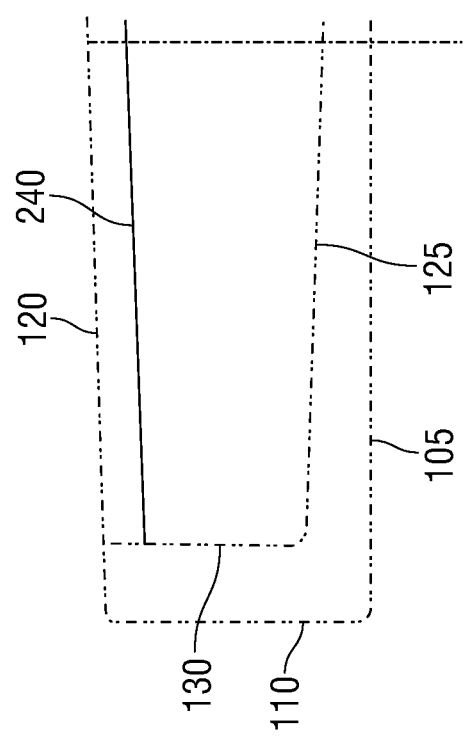

FIG. 8E shows a starboard side section of a conventional double-hull cargo transport vessel 10 with the topside deck 120. The topside structural member 240 may be disposed below topside deck 120 and attached to starboard side structural member 115. The clearance between the topside deck 120 and the topside structural member 240 may be selected to conform to regulatory and/or design requirements or preferences.

FIG. 8F shows a port side section of a conventional double-hull cargo transport vessel 10 with the topside deck 120. The topside deck structural member 220 may be disposed above topside deck 120 and attached to port side member 204p. The clearance between the topside deck 120 and the topside deck structural member 220 may be selected to conform to regulatory and/or design requirements or preferences.

FIG. 9A shows a flow chart of a method 900 for retrofitting a conventional double-hull cargo transport vessel 10 to form a complete integral tank double-hull cargo containment vessel 20. In method 900, the existing topside deck 120 of the conventional double-hull cargo transport 10 will become part of the primary hull of the complete integral tank double-hull cargo containment vessel 20. In step 910, a topside deck 120 of a conventional double-hull cargo vessel 10 may be removed. In step 920, a topside structural member 240 may be fabricated as part of a secondary hull within the primary hull. In step 930, one or more cargo containment tanks may be fabricated using structural members of the secondary hull. In step 940, a heat exchanger 270 may be disposed in the conventional double-hull cargo transport vessel 10. In step 950, one or more heating coils may be disposed in one or more of the containment tanks. In step 960, the topside deck 120 may be reinstalled forming complete integral tank double-hull cargo containment vessel 20. In some embodiments, steps 920, 930, 940, and 950 may be performed in different orders.

FIG. 9B shows a flow chart of a method 905 for retrofitting a conventional double-hull cargo transport vessel 10 to form a complete integral tank double-hull cargo containment vessel 20. In method 905, the existing topside deck 120 of the conventional double-hull cargo transport 10 will become part of the secondary hull of the complete integral tank double-hull cargo containment vessel 20. In step 915, a topside deck 120 of a conventional double-hull cargo vessel 10 may be removed. In step 925, a heat exchanger 270 may be disposed in the conventional double-hull cargo transport vessel 10. In step 935, one or more heating coils may be disposed in one or more of the containment tanks. In step 945, the topside deck 120 may be reinstalled as topside structural member 240 forming part of the secondary hull. In step 955, one or more cargo containment tanks may be fabricated using structural members of the secondary hull. In step 965, a topside structural member 220 may be fabricated as part of a primary hull to form complete integral tank double-hull cargo containment vessel 20. In some embodiments, steps 915 and 945 may be optional. In some embodiments, steps 925 and 935 may be performed after step 945.

While the disclosure has been described with reference to exemplary embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of retrofitting a conventional vessel into a complete integral tank double-hull cargo containment vessel, the method comprising the steps of:
    retrofitting a primary hull of the conventional vessel; and
    fabricating a secondary hull integrally disposed within the primary hull, wherein the secondary hull forms an interior cargo containment tank, and wherein the secondary hull is configured to receive and be in direct contact with the hot cargo and comprises a topside structural member configured to seal the cargo containment tank.

2. The method of claim 1, further comprising:
    disposing a heat exchanger on the cargo containment vessel; and disposing a heating coil within the interior cargo containment tank.

3. The method of claim 1, wherein the primary hull defines an exterior of the vessel.

4. The method of claim 1, wherein the primary bull comprises a topside deck structural member.

5. The method of claim 1, wherein the primary hull comprises a bottom side structural member.

6. The method of claim 1, wherein the primary hull comprises side structural members.

7. The method of claim 1, wherein the primary hull is water tight.

8. The method of claim 1, wherein the primary hull is configured to serve as a first boundary between an operating environment of the vessel and the cargo.

9. The method of claim 1, wherein space between the primary hull and the secondary hull is configured as a ballast.

10. The method of claim 1, wherein the secondary hull comprises a bottom side structural member.

11. The method of claim 1, wherein the secondary hull comprises side structural members.

12. The method of claim 1, wherein the secondary hull is oil or chemical tight.

13. The method of claim 1, wherein the secondary hull is configured to serve as a second boundary between an operating environment of the vessel and the cargo.

14. The method of claim 1, wherein the topside structural member of the secondary hull is a corrugated plate.

15. The method of claim 1, wherein the topside structural member of the secondary hull comprises a plurality of panel stiffening beams.

16. The method of claim 1, wherein the sealed cargo containment tank formed by the secondary hull requires a reduced size heat exchanger to maintain hot cargo at a minimum temperature.

17. The method of claim 1, wherein the sealed cargo containment tank formed by the secondary hull requires a reduced number of heating coils to maintain hot cargo at a minimum temperature.

18. The method of claim 1, wherein the sealed cargo containment tank formed by the secondary hull reduces an amount of energy required to power a heat exchanger used to maintain hot cargo at a minimum temperature.

19. The method of claim 1, wherein the sealed cargo containment tank formed by the secondary hull reduces an amount of insulation required to allow walking on a topside deck of the primary hull.

20. The method of claim 1, wherein the sealed cargo containment tank formed by the secondary hull reduces a cost associated with coating the cargo containment tank for cargo.

21. The method of claim 1, wherein the topside deck structural member of the primary hull and the topside structural member of the secondary hull are configured to provide a double-hull on the topside of the cargo containment tank.

* * * * *